Figure 1:
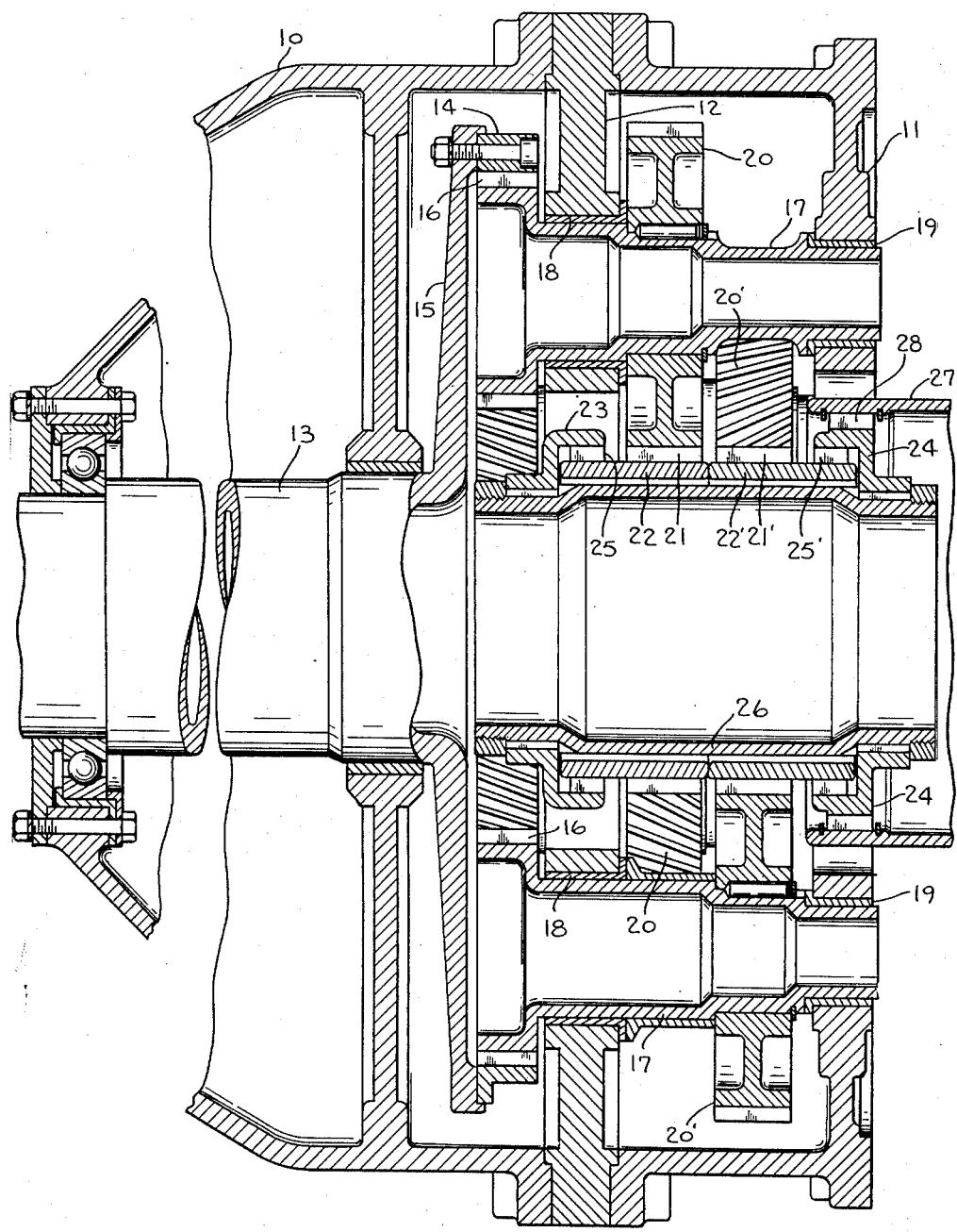

June 5, 1951 L. W. FALK 2,555,586
GEAR SET
Filed Oct. 30, 1947

INVENTOR
LOUIS W. FALK
BY
ATTORNEY

Patented June 5, 1951

2,555,586

UNITED STATES PATENT OFFICE 2,555,586

GEAR SET

Louis W. Falk, Milwaukee, Wis., assignor to The Falk Corporation, Milwaukee, Wis., a corporation of Wisconsin Application October 30, 1947, Serial No. 783,009

11 Claims. (Cl. 74—410)

This invention relates to gearing.

The type of gear set disclosed in the application of Walter P. Schmitter, Serial No. 782,981, filed October 30, 1947, involves several gear trains compactly arranged and combined in a manner to effect an equal division of the total torque load between the several trains.

One object of the present invention is to further improve the construction and operation of gear sets of the type disclosed in said application.

Another object is to provide in a gear set of the character mentioned an axially floatable dual pinion unit involving pinions free to float radially independently of each other.

Another object is to provide an articulated dual pinion unit in which each pinion is individually free to float radially without tilting.

Other more specific objects and advantages will appear, expressed or implied, from the following description of an illustrative embodiment of the invention.

The single figure of the drawing is a longitudinal sectional view of a gear set constructed in accordance with the invention.

The gear set selected for illustration comprises a housing having a forward section 10 separably joined to a rear section 11 with a shaft supporting ring 12 interposed therebetween.

The forward housing section 10 provides support for a low speed shaft 13 journaled therein and projecting therefrom. The shaft 13 carries a relatively large internal gear 14 which in this instance is shown securely attached to a disk 15 formed integral with the inner end of the shaft.

The gear 14 meshes with six equally spaced pinions 16 symmetrically disposed therein and carried by the forward ends of separate parallel shafts 17. Each shaft 17 is shown journaled in a sleeve bearing 18 fixed in the ring 12 and in a sleeve bearing 19 in the rear housing section 11, the bearings coacting to retain the shafts against axial as well as radial displacement.

A group of three equally spaced single helical gears 20 are arranged to mesh with a central pinion 21, and a similar group of three equally spaced single helical gears 20' are arranged to mesh with a central pinion 21' disposed substantially coaxial with the pinion 21. The gears 20 of one group are respectively keyed or otherwise fixed to alternate shafts 17 and the gears 20' of the other group are similarly fixed to the three remaining shafts 17, respectively.

In this instance the pinions 21 and 21' constitute parts of an articulated unit capable of free axial movement and in which each pinion is individually free to float radially, but without tilting so that the desired tooth contacts between each pinion and its mating gears are preserved. For these purposes these pinions are shown formed on separate sleeves 22 and 22', preferably in abutting relation and loosely confined between a pair of driving rings 23 and 24. The rings 23 and 24 provide separate flexible driving connections between the sleeves 22 and 22' and the opposite ends of a tubular carrier 26 which is full floating and which extends loosely through the sleeves 22 and 22'. In this instance both rings 23 and 24 are shown keyed or otherwise fixed to the carrier 26, and both sleeves 22 and 22' are provided with a circular series of teeth 25 or 25' meshing respectively with corresponding teeth formed in the rings 23 and 24, respectively.

For the purpose of transmitting a torque load to or from the pinions 21 and 21' the carrier 26 is shown connected in driving relation with the member 27 of a flexible coupling of a well known type. In this instance the coupling member 27 is connected to the carrier 26 through the ring 24, the latter being provided with a circular series of teeth 28 which mesh with corresponding teeth formed within the adjacent end of the coupling member 27. It will be noted that the pinions 21 and 21', carrier 26, and coupling member 27 are thus interconnected to effectively transmit torque between the pinions and coupling member in such manner that no axial or radial restraint is imposed on the pinions by the latter. Also, each pinion 21 and 21' is free to shift radially indepedently of the other, while maintaining the desired parallel relation between its axis and that of its mating gear.

The helix angle of one group of gears 20, and of their meshing pinion 21, is equal to but of opposite hand from the helix angle of the other group of gears 20' and pinion 21', so that the pinions 21 and 21' are axially urged in opposite directions, respectively, by the tooth reactions between each and the group of gears meshing therewith. Also, in order to avoid or minimize end thrust pressures that might otherwise exist between the pinion sleeves 22 and 22', or between those sleeves and the rings 23 or 24, each series of teeth 25 and 25' at the opposite ends of the pinion sleeves are preferably disposed at an angle equal to and in substantially the same direction as the helix angle of the connected pinion 21 or 21', so that the tooth reactions of each ring 23 or 24 imposes an axial thrust on the connected pinion 21 or 21' substantially equal and opposite to the end thrust imposed thereon by the group of meshing gears. The end thrusts imposed on each pinion sleeve 22 or 22' thus tend to counterbalance each other.

From the foregoing it will also be understood that the axial thrusts imposed on the rings 23 and 24 by the reaction of the teeth 25 and 25' are in opposite directions, and that each thrust is proportional to the total torque load transmitted through the connected pinion 21 or 21'. Consequently, should the torque load on one pinion at any time exceed that on the other pinion, this will immediately result in unbalanced thrust loads on the rings 23 and 24, causing the carrier 26 and both pinions 21 and 21' to shift axially in such direction with respect to the groups of gears 20 and 20' as to equalize the loads on the pinions. This equalization of pinion loads is of great advantage particularly in gear sets of the type herein disclosed since by reason of that feature each group of gears 20 and 20' automatically assumes an equal one half part of the torque load transmitted through the coupling member 27.

It will also be noted, that since each of the pinions 21 and 21', with its supporting sleeve 22 or 22', is free to shift radially wholly independently of the other and without tilting, each is thus free to automatically assume a position such as to equalize the tooth reactions between it and each of the three gears 20 or 20' meshing therewith and without disturbing the correct tooth contacts therebetween. Each of the three gears 20 or 20' of either group thus assumes an equal one third part of the torque load transmitted through the pinion with which they mesh, and each gear thus transmits an equal one sixth part of the whole torque load transmitted through the coupling member 27. Consequently, there is an equal torque reaction between each of the six pinions 16 and the low speed gear 14.

Various changes may be made in the embodiment of the invention hereinabove specifically described without departing from or sacrificing the advantages of the invention as defined in the appended claims.

I claim:

1. In a gear set the combination of torque transmitting means, a set of three single helical gears, a second set of three single gears of opposite hand, each of said gears being separately connected in driving relation with said means, separate single helical pinions each engaged with the gears of one of said sets, each of said pinions being radially movable relative to the gears with which it is engaged to distribute the torque load between the latter, and means interconnecting said pinions for simultaneous rotation and for axial movement as a unit to distribute the load between said sets.

2. A gear set having two sets of three single helical gears arranged about a common center, a pair of centrally disposed single helical gears having helix angles of opposite hand, each of said last named gears meshing with the three gears of one of said sets and each radially movable independently of the other, and means interconnecting said pair of gears for simultaneous rotation and for axial movement as a unit.

3. A gear set having two sets of single helical gears arranged about a common center, a pair of centrally disposed helical gears of opposite hand each engaged with the gears of one set, each of said pair of gears being axially urged in a direction opposite to that of the other by the tooth reactions between it and the set of gears meshing therewith, and means interconnecting said pair of gears for simultaneous rotation while permitting relative radial movement therebetween, said means including means reacting on said pair of gears to axially urge each in a direction opposite to the direction of urge induced by said tooth reactions.

4. In a gear set the combination of a plurality of substantially coaxial radially floating pinions, a plurality of gears each engaged with one of said pinions, and flexible torque transmitting means interconnecting said pinions without restraining the latter against radial displacement relative to one another.

5. In a gear set the combination of a plurality of substantially coaxial radially floating pinions, a plurality of gears each engaged with one of said pinions, and torque transmitting means flexibly interconnecting said pinions without restraining the latter against radial displacement relative to each other, said last named means including connections through which said pinions are free to shift axially as a unit.

6. In a gear set the combination of gearing having two concentric rows of single helical teeth of opposite hand, an articulated pinion structure comprising radially floating pinion sections each having a row of single helical teeth each meshing with one of said rows of gear teeth, and flexible torque transmitting means interconnecting said pinion sections without restraining the latter against radial displacement relative to each other.

7. An articulated pinion structure comprising a pair of substantially coaxial radially floating pinion sections having single rows of helical teeth of opposite hand, means flexibly interconnecting said pinion sections to limit relative axial movement therebetween without resisting relative radial movement therebetween and without restraining said sections against axial movement as a unit.

8. An articulated pinion structure comprising a pair of substantially coaxial single helical pinion sections of opposite hand, a torque transmitting member disposed substantially axially within said pinion sections, and a separate flexible driving connection between said member and each of said sections permitting relative radial displacement between said sections.

9. An articulated pinion structure comprising a pair of substantially coaxial single helical pinion sections of opposite hand, a torque transmitting member disposed substantially axially within said pinion sections, and a toothed driving connection between said member and each of said pinion sections permitting relative radial and angular displacement between said sections.

10. In a gear set the combination of a gear, a plurality of gears arranged in sets and separately connected in driving relation with said gear, a plurality of pinions, each of said pinions being engaged with the gears of one of said sets and radially movable relative thereto so as to distribute the torque load therebetween, and means interconnecting said pinions for simultaneous rotation and for radial displacement relative to each other.

11. In a gear set the combination of an internal gear, two sets of gears, each of said last named gears being separately connected in driving relation with said internal gear, two pinions, each of said pinions being engaged with the gears of one of said sets and radially movable relative thereto so as to distribute the torque load therebetween, and means interconnecting said pinions for simultaneous rotation and for radial displacement relative to each other.

LOUIS W. FALK.

REFERENCES CITED

The following references are of record in the file of this patent:

UNITED STATES PATENTS

| Number | Name | Date |
|---|---|---|
| 563,191 | DeLaval | June 30, 1896 |
| 1,495,703 | MacFarland | May 27, 1924 |
| 1,968,604 | Hertz et al. | July 31, 1934 |
| 2,516,077 | Schmitter | July 18, 1950 |